Dec. 30, 1952     J. C. WEAVER, JR., ET AL     2,623,903
PURIFICATION OF META-NITRO-PARA-TOLUIDINE
Filed Oct. 18, 1948
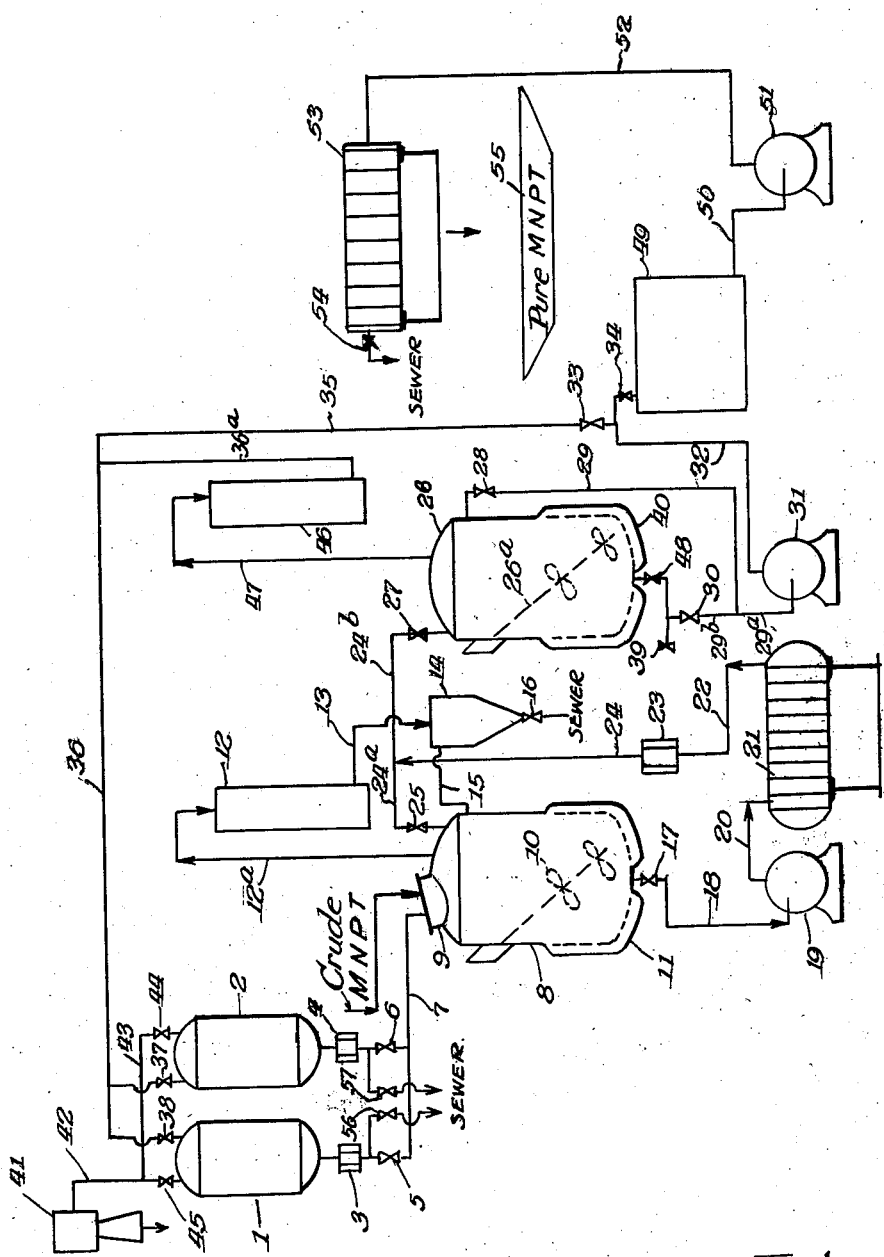
Inventors
Joe C. Weaver Jr.
Martin D. Farkas
By: Spencer, Marzall, Johnston & Cook
Attys Patented Dec. 30, 1952

2,623,903

UNITED STATES PATENT OFFICE 2,623,903

PURIFICATION OF META-NITRO-PARA-TOLUIDINE

Joe C. Weaver, Jr., Tulsa, Okla., and Martin D. Farkas, Chicago, Ill., assignors to The Sherwin-Williams Company, Cleveland, Ohio, a corporation of Ohio Application October 18, 1948, Serial No. 55,227

5 Claims. (Cl. 260—582)

This invention relates to a process for the removal of impurities from meta nitro para toluidine. More particularly, it relates to a combined extraction, clarification and unique crystallization process whereby meta nitro para toluidine is recovered from a crude water-containing press cake in a minute crystal form free from mother liquor.

In conventional purification procedures, crude meta nitro para toluidine press cake is usually dried and dissolved in hot toluene to form a nearly saturated solution. The solution is filtered hot, cooled and crystallized by means of one of the usual crystallizing processes, most often in either an open tank type crystallizer or an agitated batch type crystallizer. In the first named equipment, heat losses by evaporation, radiation, conduction and convection cause a deposition of a relatively small number of large interlocked crystals within the tank. In the latter method, cooling coils running through the tank serve to remove the heat from the saturated meta nitro para toluidine-solvent solution and thereby cause crystallization of the meta nitro para toluidine upon the cooling surfaces of the coils within the tank. The open tank type is least preferred because of the loss of valuable solvent, the fire hazard, and the toxic quality of the solvent vapors upon operating personnel. In the agitated batch type crystallizer, difficulties with heat transfer soon arise due to the growth of stagnant films of crystals upon the surface of the cooling coils, and thus reduce the heat transfer efficiency of the cooling means.

In the above methods, the crystals formed are invariably large and are of an interlocking nature, affording myriad voids which occlude the mother liquor. Because of the large size of the crystals which result from such methods, it is necessary that a grinding operation follow to reduce the crystals to a desirable commercial size range. The grinding of the crystals is extremely hazardous because of the explosive nature of the occluded solvent. Furthermore, the crystallization processes used in the prior art are slow and require a large capital expenditure to achieve high production. In addition, the presence of occluded toluene makes the crystal difficult to water-wet, which is particularly disadvantageous in subsequent diazotization. Considerable hand labor is required to remove the crystallized material from the equipment, and often impurities settle within the crystallized mass and contaminate the product.

Meta nitro para toluidine can be prepared by direct nitration of para toluidine, or as we have found preferable, through nitration of para cresol followed by amination under the pressure in the presence of certain buffers. However, by either method, impurities present are particularly undesirable in view of the major end use of the product, principally as an intermediate in the manufacture of toluidine reds through coupling of the meta nitro para toluidine with beta naphthol.

To insure uniform color, it is important that the meta nitro para toluidine be freed from tarry residues, possible catalyst carried over from prior manufacturing operations, and from other volunteer impurities.

An object of the invention is to recover a crystalline meta nitro para toluidine from an aromatic solvent mother liquor in a form that is sufficiently fine so that subsequent grinding of the crystals is unnecessary.

Another object is to reduce the hazard to operating personnel and plant by providing a closed system for purification and recovery of meta nitro para toluidine from a volatile aromatic solvent (e. g., toluene).

Another object is to decrease the high capital expenditure necessary for crystallizing equipment necessary to conventional operations, and to provide a means whereby practically no solvent losses occur either by evaporation in the processing steps, or by carry over as contaminant in the recovered product.

Still another object is to recover a meta nitro para toluidine product characterized by its minute crystalline form and freedom from caking in storage, and which is comparatively free-flowing, and less hydrophobic than by conventional recovery.

Another object is to decrease the amount of hand labor required in the recovery of the meta nitro para toluidine crystals following the crystallization step.

Other objects will appear hereinafter from the diagrammatic description of the apparatus and the accompanying detailed illustration of the process.

The procedure in accordance with this invention is esentially a toluene extraction of the crude meta nitro para toluidine press cake which contains unidentified tarry residues, water, and meta nitro para toluidine. The crude press cake is dissolved in hot aromatic solvent in a closed vessel and the temperature is held sufficiently high so that the water present is distilled, the vaporized solvent condensed, separated from the mixed aromatic solvent-water condensate and returned for re-use in the process.

To the dry solvent-meta nitro para toluidine solution are added specific clarification and adsorbent agents, and the suspension is then circulated hot through a filter press for removal of the impurities. While it is not essential that the batch be completely dehydrated, it has been observed that moisture in the solution decreases the activity of the added adsorbent agents and upon certain clays the adverse effects are most objectionable. The clear hot solvent-meta nitro para toluidine mixture is pumped into an excess quantity of a slurry of crushed ice and water. The solvent solution of the meta nitro para toluidine is cooled rapidly thereby and a near quantitative amount of meta nitro para toluidine is crystallized and recovered therefrom as very fine, powdery crystals, sufficiently small so that a subsequent grinding step is unnecessary.

It is preferred to refer to this crystallization as having occured through "shock cooling." Ice is used as the most expedient means of accomplishing this effect, but we have employed solid carbon dioxide, or Dry Ice with favorable result. It is anticipated that frozen particles of other substances insoluble in the toluene or other aromatic solvents selected might also be substituted to achieve the desired effect. Ice is preferred, however, and sufficient quantity should be employed to maintain the temperature of the mass below 10° C., during the crystallization phase of the operation.

After a settling period the excess toluene floating on the water resulting from the melted ice is decanted from the heavier meta nitro para toluidine-water layer. The last traces of toluene, not removed from decantation, are removed by vacuum distillation below a critical temperature. It can be seen that the hazards of grinding the crystals are eliminated entirely, and a minute, water-wettable crystal line product obtained.

The water wettability of the product is desirable as the purified product is later suspended in water, whereupon hydrochloric acid and sodium nitrite are added to the aqueous solution preparatory to diazotization. By prior methods of purification occluded toluene on the meta nitro para toluidine made aqueous suspension difficult to obtain.

The meta nitro para toluidine crystals are recovered from the water slurry by filtration through a plate and frame filter press. Excess surface water is removed from the crystals in the press cake by blowing the press with air. The cake contains from 10% to 15% water, and can be used as is, or dried further by conventional means.

The process of the present invention may be carried out by means of any suitable apparatus. One embodiment of apparatus suitable for the purpose is herein illustrated diagrammatically in the drawing in which meta nitro para toluidine is abbreviated as MNPT. The following detailed description taken in conjunction with the accompanying flow sheet down in the drawing is believed clearly to disclose the principles of the invention sufficiently to enable anyone skilled in the art to achieve the desired results.

Referring to the drawing, the operation of the process in one instance may be described as follows:

Two thousand pounds of crude meta nitro para toluidine press cake recovered from a prior amination step and containing 15 to 20% water, 50 to 60% of meta nitro para toluidine and 20 to 30% of toluene insoluble impurities were charged through the manhole entry 9 into steam jacketed vessel 8 into four thousand pounds of toluene previously pumped from the storage tank 2 into vessel 8 through sight glass 4, valve 6 and line 7. Care should be exercised at this point due to the explosive nature of the solvent. The cover on the manhole entry 9 of vessel 8 was tightly closed and an agitator 10 within the vessel 8 was started. Steam was admitted to the jacket 11 of vessel 8 and the temperature of the batch increased to between 85 and 88° C. Meanwhile, cooling water was circulated through the condenser 12 mounted immediately above vessel 8. As the temperature of the batch approached the degree indicated, a mixture of water vapor and toluene began to distill from vessel 8 through the condenser 12 wherein the vapors were condensed and passed through line 13 into the separatory vessel 14. Due to the differences in gravity and the incompatibility of the toluene and water mixture, the liquids separated into two layers, the toluene floating above the water in the vessel 14. After sufficient vapor had condensed, the toluene overflowed through the return line 15 to vessel 8. Water was discharged to the sewer periodically as necessary from the separatory vessel through valve 16.

As the water was distilled from the crude meta nitro para toluidine-toluene mixture, the distillation temperature arose slowly, and as the last traces of water were removed, the temperature arose rapidly to between 100 and 105° C., which was indicative of the end point in this particular phase of the purification. The temperature in vessel 8 was held at 105° C. for 30 minutes to insure complete removal of the water from the crude mixture. Thereafter the batch was cooled to about 80° C. by shutting off steam into jacket 11 and admitting cooling water thereto, as necessary. Cooling was required to reduce the losses of toluene vapors upon opening the vessel 8, and to reduce the hazard due to the toluene fumes. The cover was removed from the manhole 9 and a quantity of inorganic filter aid was added (e. g., Super Filtro, Dicalite, fuller's earth, clays, etc.) to facilitate a filter-clarification step. The manhole cover at 9 was replaced, and the temperature of the batch brought back to between 100° and 105° C. by means of steam through the jacket 11 of vessel 8. Meanwhile, the batch was agitated for an hour or more. The essentially anhydrous slurry present in vessel 8 containing meta nitro para toluidine, impurities, toluene, and filter aid, was pumped through open valve 17, line 18, pump 19, and line 20, to the filter press 21, thence through line 22, sight glass 23, lines 24 and 24ª, and open valve 25, back to vessel 8. Steam was admitted to the jacket of filter 21 and to the jackets covering critical sections of the lines 18, 20, 22, 24 and 24ª in order that the temperature be maintained above a point at which meta nitro para toluidine will crystallize out of the toluene solution and cause a "freeze up" of the said lines. By continuously circulating the material from vessel 8 through the path identified immediately above, the toluene insoluble residue and filter aid was retained in the filter press 21, and the batch thereby freed of substantially all impurities and suspended matter. The clarified toluene-meta nitro para toluidine solution assumed a sparkling clear wine-red color. This appearance as viewed in sight glass 23 was indicative of complete removal of the toluene insoluble residues, and the recycling operation was stopped.

While the solution of toluene-meta nitro para toluidine was being clarified in vessel 8, vessel 26 was charged with from 2000 to 2500 pounds of crushed ice, and sufficient water to permit agitation of the material charged. After it had been determined by observation at sight glass 23 that the hot toluene-meta nitro para toluidine solution was free from contaminant and of standard quality, the clear hot toluene-meta nitro para toluidine solution was pumped from vessel 8 through open valve 17, line 18, pump 19, line 20, press 21, line 22, glass 23, lines 24 and 24b through open valve 27 (valve 25 having been closed) into agitated crystallizing vessel 26 onto the crushed ice slurry therein in not more than 30 minutes' time and preferably less. Meanwhile, agitator 26a was in operation. Sufficient ice was maintained in vessel 26 so that the temperature did not rise above 10° C. during the addition of the toluene-meta nitro para toluidine charge.

By pumping the hot toluene-meta nitro para toluidine solution into the rapidly agitated ice in vessel 26, the meta nitro para toluidine solution was "shock-cooled" and the meta nitro para toluidine crystallized out in a very fine state of subdivision (96 to 97% of the meta nitro para toluidine dissolved in the solvent has been recovered regularly from the solvent solution). After the batch had been completely transferred to the agitator equipped crystallizing vessel 26, crystallization was completed and the contents were allowed to settle by turning off the agitator 26a in tank 26. Due to the difference in specific gravity, and the incompatibility of the toluene with the ice and water, a considerable proportion of the toluene was thereafter removed by decantation through valve 28 (which controls the overflow from the crystallizer vessel 26), lines 29 and 29a (valve 30 being closed), pump 31, line 32, valve 33 (valve 34 closed), lines 35 and 36 through either valve 38 into receiver 1 or valve 37 into receiver 2. Additional water was admitted by means of valve 39 into the bottom of vessel 26 and thereby additional solvent was removed by decantation from 28 and thence to storage through the above designated conduit system.

The step of adding additional water to vessel 26 followed by an agitation and a settling period may be repeated if it is found desirable to do so. A small amount of toluene was left in vessel 26 after the series of decantations have been accomplished. The toluene remaining was thereafter removed by vacuum distillation. Steam was admitted into jacket 40 surrounding the base of vessel 26. The temperature was not allowed to increase above 46° to 48° C. during the distillation, and a vacuum of 25 to 26 inches of mercury maintained.

The vacuum indicated was procured by means of the barometric leg 41 operating through line 42, manifold 43, open valve 44, receiver 2, against closed valves 6 and 57, closed valves 38 and 45 of receiver 1 (which was used alternately with receiver 2 during the purification) open valve 37, lines 36 and 36a, condenser 46, line 47 and the batch in vessel 26, whereby residual solvent plus some water was evaporated from the batch, condensed in condenser 46, run through line 36, valve 37 and into the receiver 2. After the receiver 2 had been filled with recovered solvent-water mixture valves 5, 37, 44, and 56 were closed, and valves 38 and 45 opened. Receiver 1 was then in line under the requisite vacuum to receive the recovered solvent from the water-crystal slurry distilland in vessel 26.

The vacuum of receiver 2 was broken and valve 57 opened allowing the water recovered with the solvent from the distillation, which had settled out from the less dense toluene, to be withdrawn from the bottom of receiver 2 through the sight glass 4 and valve 57 to the sewer. Through observations made at the sight glass 4, valve 57 was closed when all the water had been removed. The toluene remaining in the receiver 2 was in condition for re-use in the process outlined above. When receiver 1 was used to recover the toluene, the waste water was discharged through valve 56.

The water-meta nitro para toluidine slurry, freed of toluene, remaining in the crystallizer vessel 26 was removed after making certain that valves 39, 28, and 33 were closed and valves 48, 30, and 34 were opened. The slurry was pumped by means of pump 31 from vessel 26 through valve 48, valve 30, line 29b, line 29a, pump 31, line 32 and valve 34 into a storage receiver tank 49. From the receiver 49 the slurry was fed by means of line 50, pump 51 and line 52 to the filter press 53 where the purified meta nitro para toluidine crystals were separated from the water, the water being discharged to the sewer at 54.

The recovered purified crystals were further water washed for an additional half hour, and freed of excess moisture by blowing air through the press cake. The press was opened and the product collected in the boat 55 preparatory to further use in diazotization reactions.

As there was an appreciable amount of meta nitro para toluidine retained, along with residual toluene, in the residue removed by circulation through the filter 21, it was expedient to recover as much of said valuable material as possible. This end was accomplished by the use of additional hot toluene circulated from the storage vessel 2 into vessel 8 where it was heated. The hot toluene was pumped through valve 17, line 18, pump 19, line 20, press 21, line 22, glass 23, lines 24 and 24a, and valve 25 back into vessel 8. The recycle solvent containing recovered meta nitro para toluidine was used in subsequent purification operations. Excess toluene can be removed from the filter 21 by use of live steam.

From the above description it will be appreciated that there is very little loss of solvent, either by carry-over with the crystallized product, or by losses due to processing steps. Experience has shown that 96 to 97% of the meta nitro para toluidine is recovered by the method of crystallization used, and that increased efficiency in recovery of meta nitro para toluidine can be achieved by washing the first clarification filter with additional hot toluene.

Through the use of ice as a coolant, heat transfer between the solvent solution and the ice is maintained uniformly high and uniformly efficient during the crystallization. The constantly renewed cooling interface between ice and solvent eliminates building up of a stagnant crystal layer at the heat transfer interface which normally occurs in the agitator-tank cooling-coil type crystallizer.

By vacuum removal of traces of solvent from the meta nitro para toluidine-crystal-water-slurry no residual mother liquor is occluded in the product.

The invention is hereby claimed as follows:

1. A process for the purification of meta nitro para toluidine comprising essentially the following steps: dispersing a water-containing meta nitro para toluidine crude in a volatile aromatic hydrocarbon solvent, said solvent being immiscible with water, chemically inert to the meta nitro para toluidine and capable of selectively dissolving the meta nitro para toluidine, removing substantially all the water from the resulting dispersion by distilling therefrom and condensing a water-solvent mixture, separating and returning the aromatic solvent portion of said condensate to the distilland, continuing the distillation until the said distilland becomes substantially anhydrous, incorporating inorganic filter agents of high specific surface with the distilland, removing the insoluble suspended matter from said hot distilland, subjecting the clarified filtrate to a temperature at least below 10° C. by rapid exposure to a finely divided solid coolant in aqueous carrier therefor, thereby rapidly crystallizing the meta nitro para toluidine from the solvent solution in minute crystals, removing the solvent from the crystals at a temperature below about 48° C., and thereafter recovering the purified meta nitro para toluidine in the said minute crystal form from the residual aqueous media in a solvent-free water-wetted state.

2. A process for the purification of meta nitro para toluidine comprising essentially the following steps: dispersing a water-containing meta nitro para toluidine crude in toluene, dissolving the meta nitro para toluidine in said solvent, removing substantially all the water from the resulting dispersion by distilling therefrom and condensing a water-toluene mixture, separating and returning the toluene portion of said condensate to the distilland, continuing the distillation until the said distilland becomes substantially anhydrous, incorporating inorganic filter agents of high specific surface with the distilland, removing the insoluble suspended matter by circulation of said hot distilland through a filter, shock cooling the clarified filtrate by rapid exposure to a sufficient mass of crushed ice to bring the temperature to at least below 10° C., thereby rapidly crystallizing the meta nitro prara toluidine from the toluene solution in minute crystals, removing the bulk of the water from the solvent by decantation and the solvent from the residue by distillation under sufficient vacuum so that the temperature of the distilland does not exceed about 48° C., and thereafter recovering the purified crystals of meta nitro para toluidine in a finely subdivided solvent-free water-wetted state from the aqueous slurry.

3. A process for the purification of meta nitro para toluidine comprising essentially the following steps: dispersing a water-containing meta nitro para toluidine crude in toluene, dissolving the meta nitro para toluidine in said solvent, removing substantially all the water from the resulting dispersion by distilling therefrom and condensing a water-toluene mixture, separating and returning the toluene portion of said condensate to the distilland, continuing the distillation until the said distilland becomes substantially anhydrous, incorporating inorganic filter agents of high specific surface with the distilland, removing the insoluble suspended matter by circulation of said hot distilland through a filter, shock cooling the clarified filtrate by rapid exposure to a sufficient mass of crushed ice to bring the temperature to at least below 10° C., thereby rapidly crystallizing the meta nitro para toluidine from the toluene solution in minute crystals, removing the bulk of the water from the solvent by decantation and the solvent from the residue by distillation under a reduced pressure of less than 26 inches of mercury and a temperature not greater than about 48° C., and thereafter recovering the purified crystals of metal nitro para toluidine in a finely subdivided solvent-free state from the aqueous slurry.

4. A process for the purification of meta nitro para toluidine comprising essentially the following steps: dispersing a water-containing meta nitro para toluidine crude in toluene, dissolving the meta nitro para toluidine in said solvent, removing substantially all the water from the resulting dispersion by distilling therefrom and condensing a water-toluene mixture, separating and returning the toluene portion of said condensate to the distilland zone, continuing the distillation until the said distilland becomes substantially anhydrous, incorporating inorganic filter agents of high specific surface with the distilland, removing the insoluble suspended matter by circulation of said hot distilland through a filter, shock cooling the clarified filtrate by rapid exposure to a sufficient mass of crushed ice to bring the temperature at least below 10° C., thereby rapidly crystallizing the meta nitro para toluidine from the toluene solution in minute crystals, removing the bulk of the water from the solvent by decantation, removing the solvent from the residue by distillation under a reduced pressure of less than 26 inches of mercury and a temperature not greater than about 48° C., thereafter recovering the purified crystals of meta nitro para toluidine in a finely subdivided solvent-free state, leaching the residual meta nitro para toluidine remaining in said filter with additional hot toluene and returning the resultant wash solvent toluene to the distilland zone for subsequent re-use in the described process.

5. A process for the purification of meta nitro para toluidine comprising essentially the following steps: dispersing a water-containing meta nitro para toluidine in toluene, removing substantially all the water from the resultant dispersion by distilling therefrom and condensing a water-solvent mixture, separating and returning the solvent portion of said condensate to the distilland, continuing the distillation until the said distilland becomes substantially anhydrous, incorporating inorganic filter agents of high specific surface with the distilland, removing the insoluble suspended matter from the hot distilland, shock cooling the clarified filtrate by rapid exposure to crushed ice to crystallize rapidly the meta nitro para toluidine from the solvent solution in minute crystals, removing the bulk of the water from the solvent by decantation, distilling the solvent from the residue, thereafter recovering the purified crystals of meta nitro para toluidine in a finely subdivided solvent-free state, leaching the solvent from the insoluble matter previously removed in the process and returning said solvent for re-use in the described process.

JOE C. WEAVER, Jr.
MARTIN D. FARKAS.

REFERENCES CITED

The following references are of record in the file of this patent:

UNITED STATES PATENTS

| Number | Name | Date |
|---|---|---|
| 1,301,388 | Conover | Apr. 22, 1919 |
| 1,679,752 | Tanberg et al. | Aug. 7, 1928 |
| 1,794,097 | Weiland et al. | Feb. 24, 1931 |
| 1,878,950 | Lyford | Sept. 20, 1932 |
| 2,204,059 | Acken | June 11, 1940 |